Nov. 14, 1967    R. L. WHITE    3,353,067
AC CIRCUIT BREAKER
Filed Oct. 12, 1964    2 Sheets-Sheet 1

INVENTOR.
RICHARD L. WHITE
BY
McLaughlin Cahill & Drummond
ATTORNEYS

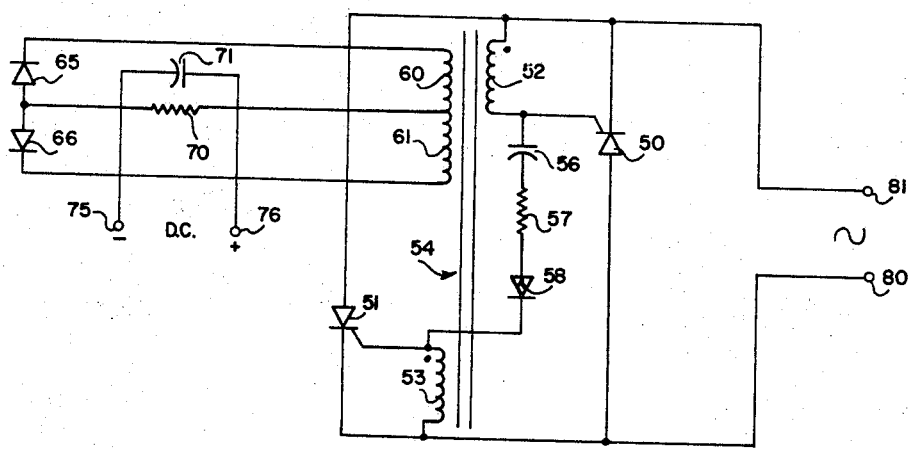
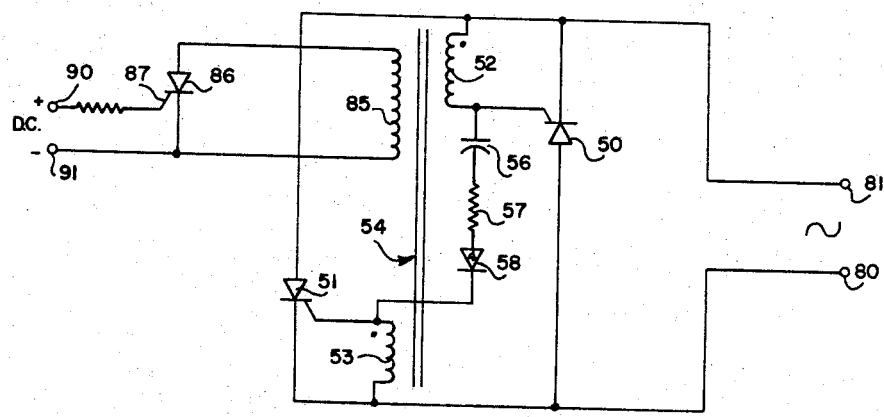

3,353,067
AC CIRCUIT BREAKER
Richard L. White, Paradise Valley, Ariz., assignor to
Dickson Electronics Corporation
Filed Oct. 12, 1964, Ser. No. 403,288
11 Claims. (Cl. 317—33)

ABSTRACT OF THE DISCLOSURE

An AC circuit breaker using back-to-back controlled rectifiers having control electrodes inductively coupled through a transformer; a transient producing circuit is connected between the control electrodes to initiate conduction through the circuit breaker, and a control winding is provided on the transformer for controlling the conduction after it begins.

---

The present invention pertains to AC circuit breakers, and more specifically, to a solid state circuit breaker operating as electrical contacts that may readily be opened and reclosed.

The present state of the art in regard to contact devices and circuit breakers requires that dependability, small size, and cost of manufacture be the prime consideration in the utilization of such devices. In such complicated equipment as electronic computers and data processing systems, the utilization of a large number of circuit breakers has become imperative to protect the intricate and relatively expensive circuitry of the system. Circuit breakers utilized in such applications are frequently required to be miniaturized while nevertheless providing reliability and, since a large number will be utilized, must be provided at a minimum cost.

It is therefore an object of the present invention to provide an AC circuit breaker, utilizing solid state devices, that is gated each succeeding half cycle to thereby act as a pair of closed contacts.

It is another object of the present invention to provide an AC circuit breaker that may readily be utilized to interrupt the circuit to which it is connected as the impressed voltage thereon passes through zero.

It is still another object of the present invention to provide an AC circuit breaker that can readily be miniaturized wthout sacrificing reliability.

It is still another object of the present invention to provide an AC circuit breaker that is rugged and may be produced at a minimum of cost with few components and no moving parts.

Further objects and advantages of the present invention will become apparent to those skilled in the art as the description thereof proceeds.

Briefly, in accordance with one embodiment of the present invention, the present invention contemplates the utilization of controlled rectifier devices connected in parallel across terminals connected to the external circuit to be interrupted. The controlled rectifiers include control electrodes which are connected to the primary and secondary windings respectively of a small transformer. The anode and cathode electrodes of the controlled rectifiers are connected in back-to-back relationship so that the direction of conduction, when gated, will be in opposite directions for each. Accordingly, when one of the controlled rectifiers conducts, the gate current of the control rectifier will establish a magnetic field in one of the windings of the transformer. As the current flowing through the conducting controlled rectifier passes through zero, the corresponding magnetic field collapses and induces a voltage in the opposite winding to provide a transient triggering current to the control electrode of the other controlled rectifier. As a consequence of this action, the circuit breaker of the present invention conducts alternating current without interruption and may be utilized to interrupt the current merely by interrupting the inductive relationship between the primary and secondary windings of the transformer.

The present invention may best be described by reference to the accompanying drawings in which:

FIGURE 6 is a schematic illustration of a normally-open contact implementing the teachings of the present invention.

FIGURE 7 is a schematic diagram of a normally-closed contact implementing the teachings of the present invention.

Figures 1, 2:
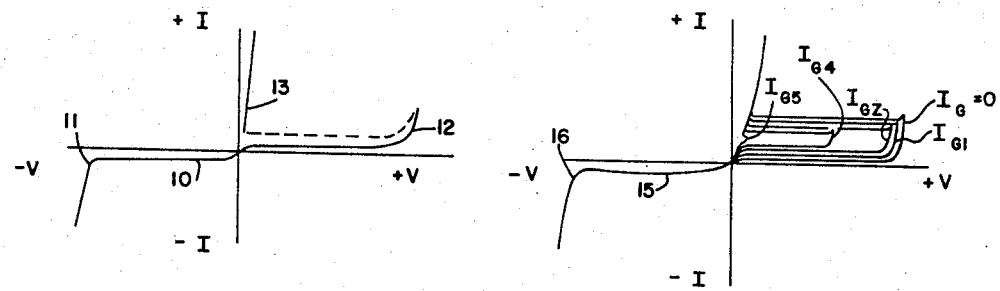
FIGURE 1 is an illustration of a typical PNPN device (sometimes referred to as "four-layer"), useful for describing the operation of the present invention.
FIGURE 2 is a schematic illustration of several typical silicon-controlled rectifier characteristics useful for describing the present invention.

Before discussing the concept of the present invention, it will be useful to first refer to the well-known typical characteristics of four-layer devices, tunnel diodes, and silicon-controlled rectifiers. Referring to FIGURE 1, it may be seen that a four-layer device, which is essentially two back-biased PN junctions in series, exhibits characteristics very similar to ordinary back-biased silicon rectifiers. A reverse voltage will result in very little reverse current as exhibited by the portion of the curve 10. As the reverse voltage is impressed on the four-layer device, a reverse break-down voltage is reached, as represented by the knee 11 of the curve, wherein the reverse current increases rapidly with an increase in reverse voltage. When a forward voltage is applied to the four-layer device, a similar forward resistance is exhibited by the device until a forward break-over voltage is reached represented in FIGURE 1 by the portion of the curve 12. When the voltage at point 12 is reached, the forward resistance of the device drops substantially instantaneously to a very low forward resistance and thereafter exhibits a relatively low forward incremental resistance as indicated by the slope of the portion 13 of the curve. Thus, when the break-over voltage is exceeded, the resistance of the four-layer device quickly and radically drops to a very low value. The explanation of the curve of FIGURE 1 representing the characteristic of a four-layer device may be extended to the curves of FIGURE 2 representing typical silicon-controlled rectifier characteristics. Referring to FIGURE 2, it may be seen that the curves illustrated thereon exhibit a reverse resistance portion 15 representing a very high resistance until a reverse break-down voltage 16 is attained. The forward break-over voltage in a controlled rectifier may be controleld by injecting gate current into the control electrode thereof. The curves of FIGURE 2 illustrate the effect on the break-over voltage of various gate currents $I_G$ injected into the controlled rectifier. For further explanation of the operation of four-layer devices or controlled rectifiers, reference may be had to any one of several manuals and texts such as, for example, Controlled Rectifier Manual, General Electric Company, Auburn, N.Y.

Figure 3:
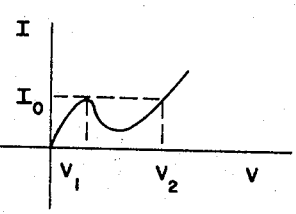
FIGURE 3 is an illustration of a typical characteristic of a tunnel diode useful for describing the operation of one embodiment of the present invention.

Referring to FIGURE 3, a typical characteristic of a tunnel diode device is shown. It may be seen as the current through the tunnel diode increases, the voltage drop across the tunnel diode increases in an approximate proportional manner. When a current value is reached equal to the current shown in FIGURE 3 as $I_0$, a point of instability is reached wherein a further increase in current passing through the tunnel diode will be accompanied by a rapid change in the voltage drop across the diode from $V_1$ to $V_2$. Thus, tunnel diode devices may readily be utilized as current-sensitive devices that will provide a voltage change in a circuit indicative of a current through the diode in excess of a given value.

Figure 4:
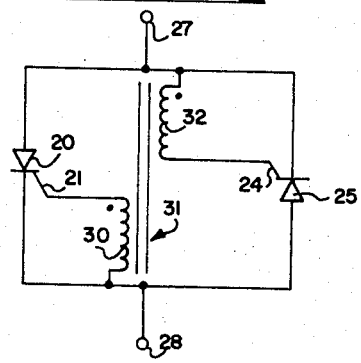
FIGURE 4 is a schematic diagram of a circuit utilizing the concept of the present invention.

With the characteristics of four-layer devices and controlled rectifiers, as above described, in mind, reference will now be had to FIGURE 4 wherein the concept of the present invention is shown. A pair of controlled rectifiers 20 and 25, which may conveniently be silicon-controlled rectifiers, are connected between terminals 27 and 28. The controlled rectifiers 20 and 25 are connected oppositely relative to each other so that the anodes and cathode electrodes of the respective controlled rectifiers are connected to opposite terminals. The controlled rectifiers 20 and 25 are provided with control electrodes 21 and 24 respectively. The control electrode 21 of the controlled rectifier 20 is connected to a primary winding 30 of a transformer 31. The opposite side of the winding 30 is connected to the terminal 28. Similarly, the control electrode 24 of the controlled rectifier 25 is connected to one side of the secondary winding 32 of the transformer 31; the opposite side of the winding 32 is connected to the terminal 27. The sense of the windings 30 and 32 are indicated in FIGURE 4 by the polarity dots.

The operation of the circuit of FIGURE 4 may be described as follows. It will be assumed that the circuit breaker of FIGURE 4 is presently conducting and that an external device was used to initiate conduction. During that portion of the AC cycle that the terminal 27 is positive relative to the terminal 28, the controlled rectifier 20 is conducting in the forward direction. Gate current flowing through the control electrode 21 and the winding 30 establishes a magnetic field in both the primary and secondary windings as indicated by the polarity dots. As the polarity of the impressed voltage on the terminals 27 and 28 passes through zero, current through the controlled rectifier 20 ceases and the magnetic field established by the current through the winding 30 collapses thus generating a voltage transient of opposite polarity. This transient induced in the secondary winding 32 is of appropriate polarity that, when applied to the control electrode 24 of the controlled rectifier 25 gates the rectifier to the conducting state thus permitting current to flow from the terminal 28 to the terminal 27 as the voltage across these terminals passes from zero to positive in the direction of current flow from terminal 28 to terminal 27. Gate current flowing in the control electrode 24 thereafter establishes a magnetic field in the transformer 31 and, upon the cessation of conduction through the controlled rectifier 25, the collapse of the magnetic field induces a voltage transient in the primary winding 30 to gate the controlled rectifier 20 to its conducting state. Thus, alternate half cycles are gated through the respective controlled rectifiers and the terminals 27 and 28 are in electrical contact.

Figure 5:
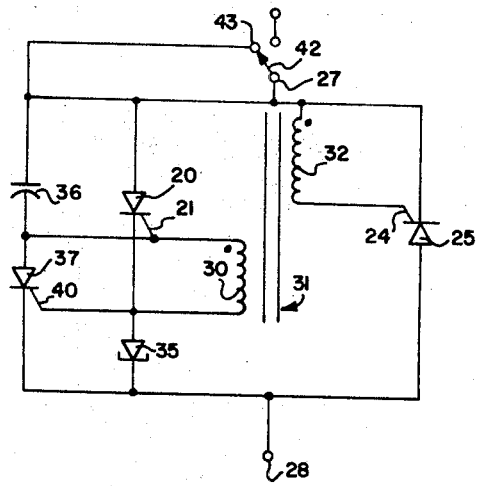
FIGURE 5 is a schematic illustration of an AC circuit breaker utilizing the concept of the present invention and sensitive to overcurrent for opening the circuit.

It may be seen that the circuit of FIGURE 4 may be utilized to interrupt the current between the terminals 27 and 28 by interrupting the generation of the magnetic field necessary to gate the controlled rectifiers. The circuit of FIGURE 5 includes a means for interrupting the generation of the magnetic field. Referring to FIGURE 5, like numerals have been utilized to indicate like elements previously shown in connection with FIGURE 4. The controlled rectifier 20 is connected in series with a tunnel diode 35 which may conveniently be utilized as a current sensing device as will be described more fully hereinafter. A capacitor 36 is connected in series with a controlled rectifier 37 between the terminals 28 and 27. The control electrode 40 of the controlled rectifier 37 is connected to the secondary winding 30. The secondary winding 30 is also connected to the anode electrode of the controlled rectifier 37 as well as to the control electrode 21 of the controlled rectifier 20 and to the anode of the tunnel diode 35. The terminal 27 is connected to a resetting switch 42 to permit the circuit breaker of FIGURE 5 to be reset. The capacitor 36 is also connected to the off-position terminal 43 of the switch 42. The operation of FIGURE 5 is as follows. When the switch 42 is placed in the on position, the transient caused by closing the switch gates one of the controlled rectifiers, such as rectifier 20, into its conducting state and current flows through the controlled rectifier 20 and the tunnel diode 35 to the terminal 28. The gate current from the control electrode 21 through the winding 30 of the transformer establishes a magnetic field similar to that described in connection with FIGURE 4. The resulting collapse of the magnetic field and subsequent generation of a transient having an opposite polarity to trigger the controlled rectifier 25 to the conducting state is identical to that described in connection with FIGURE 4; however, if sufficient current passes through the tunnel diode 35 to switch it from its low voltage to its high voltage state, the resulting bias applied to the control electrode 40 of the controlled rectifier 37 gates the latter to its conducting state to thereby short out the winding 30. The result of the controlled rectifier 37 conducting is that the current from the control electrode 21 no longer passes through the winding 30 to establish a magnetic field and, instead, passes through the controlled rectifier 37. As a result of this action, the next subsequent half cycle impressed upon the terminals 27 and 28 is not accompanied by a collapse of a magnetic field to gate the controlled rectifier 25 to its conducting state. Therefore, the circuit of FIGURE 5 acts as an open circuit thereby blocking further conduction from terminal 27 to 28. The circuit continues to act as an open circuit until the switch 42 is opened and reclosed to reset the circuit.

Referring now to FIGURE 6, the concept of the present invention is implemented in a normally-opened contact. The controlled rectifiers 50 and 51 are connected to windings 52 and 53 respectively of a transformer 54. The sense of the windings and the connections are identical to that shown in FIGURE 3; however, a transient producing means such as a relaxation oscillator, including a capacitor 56, a resistor 47, and a four-layer device 58 is connected between the control electrodes of the controlled rectifiers 50 and 51. A third winding or control winding 60 having a center tap 61 is also provided on the transformer 54 and is connected to back-to-back diodes 65 and 66. The junction between the anodes of the diodes 65 and 66 is connected to the center tap 61 of the transformer through a resistance 70. A paralleling capacitor 71 is connected across the resistor 70. A pair of control terminals 75 and 76 are connected to opposite ends of the resistor 70 and are provided for receiving a DC control input signal for reasons to be explained later. Terminals 80 and 81 are connected into the circuits in which the normally-opened contact of FIGURE 6 is to operate. Under normal conditions, no DC control signal will be applied to the terminal 75 and 76; therefore, when an AC signal is applied to the terminals 80 and 81, any oscillations provided by the relaxation oscillator are absorbed by the resistance 70 acting as a shorting resistor across the winding 60. The circuit of FIGURE 6 will therefore appear as an open contact to the terminals 80 and 81 so long as the connections to the winding 60 maintain a low impedance. When a DC control signal is applied to the terminals 75 and 76, the winding 60 is essentially open circuited provided the DC control input signal level is sufficient to overcome the generated EMF in the winding 60. Thus, the relaxation oscillator provides transient signals to gate the controlled rectifier 51 or the controlled rectifier 50 to its conducting state. Which of the controlled rectifiers is gated on will depend on the polarity of the impressed voltage at the terminals 80 and 81 at the time that the DC control signal is applied to the terminals 75 and 76. After the first controlled rectifier begins conduction, the action of the collapsing magnetic field described in connection with FIGURE 4 provides continued alternate conduction of controlled rectifiers 50 and 51 to thus make the circuit of FIGURE 6 appear as a closed contact to the terminals 80 and 81. The contact may be opened again by removal of the DC control signal at the terminals 75 and 76.

Referring to FIGURE 7, the concept of the present invention is shown in a modified form to provide a normally closed contact. The circuit of FIGURE 7 is quite similar to the circuit of FIGURE 6 with the exception that the third or control winding 85 is not provided with a center tap and a controlled rectifier 86 is connected in series with the winding 85. Any gated variable impedance device may be used in lieu of rectifier 86 such as, for example, a transistor with the emitter-collector circuit connected in series with the winding 85. The control electrode 87 of the controlled rectifier 86 is connected to control terminals 90 and 91. The operation of the circuit of FIGURE 7 is similar to that of FIGURE 6 with the exception that the impedance of the control winding circuit including the winding 85 and the controlled rectifier 86 is normally high; accordingly, an application of an appropriate AC voltage to the terminals 80 and 81 will cause oscillation of the relaxation oscillator and consequent triggering of an appropriate one of the controlled rectifiers 50 or 51. Continued gating of the controlled rectifiers takes place through the establishing and subsequent collapse of the magnetic field as described in connection with FIGURE 4. Thus, the circuit of FIGURE 7 operates as a normally-closed contact. When a DC control signal is applied to the terminals 90 and 91, and the controlled rectifier 86 is gated to its conducting condition, the impedance of the circuit including the controlled rectifier 86 and the control winding 85 substantially decreases, and the collapse of the magnetic field now produces a transient that is substantially absorbed by the control winding circuit without the generation of a triggering transient applied to the corresponding controlled rectifier. Thus, the application of a DC control signal to the terminals 90 and 91 of the circuit of FIGURE 7 will result in the opening of the contacts and will remain as an open contact to the terminals 80 and 81 so long as the DC control signal remains at the terminals 90 and 91.

The four-layer device of FIGURES 6 and 7 acts as an appropriate non-linear element, as indicated by its characteristic shown in FIGURE 1, to provide, in conjunction with the capacitance 56 and resistance 57, the necessary transient to initially trigger one of the controlled rectifiers into the conducting condition. Other devices may be used in lieu of the four-layer device such as, for example, a zener diode.

It will therefore be obvious to those skilled in the art that many modifications may be made in the circuitry shown in the accompanying drawings. It is therefore intended that the present invention be limited only by the scope of the claims appended hereto.

I claim:

1. An AC circuit breaker comprising:
 (a) a first and a second terminal,
 (b) a first and a second controlled rectifier each having an anode electrode, a cathode electrode, and a control electrode,
 (c) means connecting the anode and cathode electrodes of said first controlled rectifier to said first and second terminals respectively,
 (d) means connecting the cathode and anode electrodes of said second controlled rectifier to said first and second terminals respectively,
 (e) a transformer having a primary and a secondary winding,
 (f) means connecting one side of said primary winding to the control electrode of said first controlled rectifier and the other side of said primary winding to said second terminal,
 (g) means connecting one side of said secondary winding to the control electrode of said second controlled rectifier and the other side of said secondary winding to said first terminal,
 (h) said primary and secondary windings inductively related to provide voltages at the respective sides of said windings connected to said control electrodes for gating the corresponding controlled rectifier,
 (i) a control winding on said transformer,
 (j) variable impedance means connected in series with said control winding, and
 (k) transient producing means connected to said control electrodes for initiating conduction through one of said controlled rectifiers when said variable impedance is low.

2. An AC circuit breaker comprising:
 (a) a first and a second terminal,
 (b) a first and a second gated unidirectional conducting means each having an anode electrode, a cathode electrode, and a control electrode,
 (c) means connecting the anode and cathode electrode of said first gated unidirectional conducting means to said first and second terminals respectively,
 (d) means connecting the cathode and anode electrodes of said second gated unidirectional conducting means to said first and second terminals respectively,
 (e) a transformer having a primary and a secondary winding,
 (f) means connecting one side of said primary winding to the control electrode of said first gated unidirectional conducting means and the other side of said primary winding to said second terminal,
 (g) means connecting one side of said secondary winding to the control electrode of said second gated unidirectional conducting means and the other side of said secondary winding to said first terminal,
 (h) said primary and secondary windings inductively related to provide voltages at the respective sides of said windings connected to said control electrodes for gating the corresponding gated unidirectional conducting means,
 (i) a control winding on said transformer,
 (j) variable impedance means connected in series with said control winding, and
 (k) transient-producing means connected to said control electrodes for initiating conduction through one of said gated unidirectional conducting means when said variable impedance is low.

3. An AC circuit breaker comprising:
 (a) a first and a second terminal,
 (b) a first and a second controlled rectifier each having an anode electrode, a cathode electrode, and a control electrode,
 (c) means connecting the anode and cathode electrodes of said first controlled rectifier to said first and second terminals respectively,
 (d) means connecting the cathode and anode electrodes of said second controlled rectifier to said first and second terminals respectively,
 (e) a transformer having a primary and a secondary winding,
 (f) means connecting one side of said primary winding to the control electrode of said first controlled rectifier and the other side of said primary winding to said second terminal, (g) means connecting one side of said secondary winding to the control electrode of said second controlled rectifier and the other side of said secondary winding to said first terminal, (h) said primary and secondary windings inductively related to provide voltages at the respective sides of said windings connected to said control electrodes for gating the corresponding controlled rectifier, (i) a control winding on said transformer, (j) variable impedance means connected in series with said control winding, and (k) a relaxation oscillator connected to said control electrodes for initiating conduction through one of said controlled rectifiers when said variable impedance is low.

4. An AC circuit breaker comprising:

(a) a first and a second terminal, (b) a first and a second controlled rectifier each having an anode electrode, a cathode electrode, and a control electrode, (c) means connecting the anode and cathode electrodes of said first controlled rectifier to said first and second terminals respectively, (d) means connecting the cathode and anode electrodes of said second controlled rectifier to said first and second terminals respectively, (e) a transformer having a primary and a secondary winding, (f) means connecting one side of said primary winding to the control electrode of said first controlled rectifier and the other side of said primary winding to said second terminal, (g) means connecting one side of said secondary winding to the control electrode of said second controlled rectifier and the other side of said secondary winding to said first terminal, (h) said primary and secondary windings inductively related to provide voltages at the respective sides of said windings connected to said control electrodes for gating the corresponding controlled rectifier, (i) a control winding on said transformer, (j) a pair of diodes having their anodes connected together and their cathodes connected to opposite sides of said control winding, (k) a resistance connecting the anodes of said diodes to the center of said control winding, (l) a capacitance connected in parallel with said resistance, (m) a pair of control terminals connected to opposite sides of said resistance for receiving control signals, and (n) transient-producing means connected to said control electrodes for initiating conduction through one of said controlled rectifiers when said variable impedance is low.

5. An AC circuit breaker comprising:

(a) a first and a second terminal, (b) a first and a second gated unidirectional conducting means each having an anode electrode, a cathode electrode, and a control electrode, (c) means connecting the anode and cathode electrode of said first gated unidirectional conducting means to said first and second terminals respectively, (d) means connecting the cathode and anode electrodes of said second gated unidirectional conducting means to said first and second terminals respectively, (e) a transformer having a primary and a secondary winding, (f) means connecting one side of said primary winding to the control electrode of said first gated unidirectional conducting means and the other side of said primary winding to said second terminal, (g) means connecting one side of said secondary winding to the control electrode of said second gated unidirectional conducting means and the other side of said secondary winding to said first terminal, (h) said primary and second windings inductively related to provide voltages at the respective sides of said windings connected to said control electrodes for gating the corresponding gated unidirectional conducting means, (i) a control winding on said transformer, (j) a pair of diodes having their anodes connected together and their cathodes connected to opposite sides of said control winding, (k) resistance connecting the anodes of said diodes to the center of said control winding, (l) a capacitance connected in parallel with said resistance, (m) a pair of control terminals connected to opposite sides of said resistance for receiving control signals, and (n) transient-producing means connected to said control electrodes for initiating conduction through one of said gated unidirectional conducting means when said variable impedance is low.

6. An AC circuit breaker comprising:

(a) a first and a second terminal, (b) a first and a second controlled rectifier each having an anode electrode, a cathode electrode, and a control electrode, (c) means connecting the anode and cathode electrodes of said first controlled rectifier to said first and second terminals respectively, (d) means connecting the cathode and anode electrodes of said second controlled rectifier to said first and second terminals respectively, (e) a transformer having a primary and a secondary winding, (f) means connecting one side of said primary winding to the control electrode of said first controlled rectifier and the other side of said primary winding to said second terminal, (g) means connecting one side of said secondary winding to the control electrode of said second controlled rectifier and the other side of said secondary winding to said first terminal, (h) said primary and secondary windings inductively related to provide voltages at the respective sides of said windings connected to said control electrodes for gating the corresponding controlled rectifier, (i) a control winding on said transformer, (j) variable impedance means connected in series with said control winding, and (k) a series circuit comprising a capacitor, a resistor, and a four-layer device, connected between said control electrodes.

7. An AC circuit breaker comprising:

(a) a first and a second terminal, (b) a first and a second gated unidirectional conducting means each having an anode electrode, a cathode electrode, and a control electrode, (c) means connecting the anode and cathode electrode of said first gated unidirectional conducting means to said first and second terminals respectively, (d) means connecting the cathode and anode electrodes of said second gated unidirectional conducting means to said first and second terminals respectively, (e) a transformer having a primary and a secondary winding, (f) means connecting one side of said primary winding to the control electrode of said first gated unidirectional conducting means and the other side of said primary winding to said second terminal, (g) means connecting one side of said secondary winding to the control electrode of said second gated unidirectional conducting means and the other side of said secondary winding to said first terminal, (h) said primary and secondary windings inductively related to provide voltages at the respective sides of said windings connected to said control electrodes for gating the corresponding gated unidirectional conducting means, (i) a control winding on said transformer, (j) variable impedance means connected in series with said control winding, and (k) a series circuit comprising a capacitor, a resistor, and a four-layer device, connected between said control electrodes.

8. An AC circuit breaker comprising:

(a) a first and a second terminal, (b) a first and a second controlled rectifier each having an anode electrode, a cathode electrode, and a control electrode, (c) means connecting the anode and cathode electrodes of said first controlled rectifier to said first and second terminals respectively, (d) means connecting the cathode and anode electrodes of said second controlled rectifier to said first and second terminals respectively, (e) a transformer having a primary and a secondary winding, (f) means connecting one side of said primary winding to the control electrode of said first controlled rectifier and the other side of said primary winding to said second terminal, (g) means connecting one side of said secondary winding to the control electrode of said second controlled rectifier and the other side of said secondary winding to said first terminal, (h) said primary and secondary windings inductively related to provide voltages at the respective sides of said windings connected to said control electrodes for gating the corresponding controlled rectifier, (i) a control winding on said transformer, (j) a pair of diodes having their anodes connected together and their cathodes connected to opposite sides of said control winding, (k) a resistance connecting the anodes of said diodes to the center of said control winding, (l) a capacitance connected in parallel with said resistance, (m) a pair of control terminals connected to opposite sides of said resistance for receiving control signals, and (n) a series circuit comprising a capacitor, a resistor, and a four-layer device connected between said control electrodes.

9. An AC circuit breaker comprising:

(a) a first and a second terminal, (b) a first and a second controlled rectifier each having an anode electrode, a cathode electrode, and a control electrode, (c) means connecting the anode and cathode electrodes of said first controlled rectifier to said first and second terminals respectively, (d) means connecting the cathode and anode electrodes of said second controlled rectifier to said first and second terminals respectively, (e) a transformer having a primary and a secondary winding, (f) means connecting one side of said primary winding to the control electrode of said first controlled rectifier and the other side of said primary winding to said second terminal, (g) means connecting one side of said secondary winding to the control electrode of said second controlled rectifier and the other side of said secondary winding to said first terminal, (h) said primary and secondary windings inductively related to provide voltages of the respective sides of said windings connected to said control electrodes for gating the corresponding controlled rectifier, (i) a control winding on said transformer, (j) a pair of diodes having their anodes connected together and their cathodes connected to opposite sides of said control winding, (k) a resistance connecting the anodes of said diodes to the center of said control winding, (l) a capacitance connected in parallel with said resistance, (m) a pair of control terminals connected to opposite sides of said resistance for receiving control signals, and (n) a series circuit comprising a capacitor, a resistor, and a four-layer device, connected between said control electrodes.

10. An AC circuit breaker comprising:

(a) a first and a second terminal, (b) a first and a second controlled rectifier each having an anode electrode, a cathode electrode, and a control electrode, (c) means connecting the anode and cathode electrodes of said first controlled rectifier to said first and second terminals respectively, (d) means connecting the cathode and anode electrodes of said second controlled rectifier to said first and second terminals respectively, (e) a transformer having a primary and a secondary winding, (f) means connecting one side of said primary winding to the control electrode of said first controlled rectifier and the other side of said primary winding to said second terminal, (g) means connecting one side of said secondary winding to the control electrode of said second controlled rectifier and the other side of said secondary winding to said first terminal, (h) said primary and secondary windings inductively related to provide voltages at the respective sides of said windings connected to said control electrodes for gating the corresponding controlled rectifier, (i) a control winding on said transformer, (j) a gated variable impedance device, including a control electrode, connected in series with said control winding, and (k) means connected to the control electrode of said gated variable impedance device for applying gating signal thereto for changing the impedance of said device.

11. An AC circuit breaker comprising:

(a) a first and a second terminal, (b) a first and a second gated unidirectional conducting means each having an anode electrode, a cathode electrode, and a control electrode, (c) means connecting the anode and cathode electrode of said first gated unidirectional conducting means to said first and second terminals respectively, (d) means connecting the cathode and anode electrodes of said second gated unidirectional conducting means to said first and second terminals respectively, (e) a transmormer having a primary and a secondary winding, (f) means connecting one side of said primary winding to the control electrode of said first gated unidirectional conducting means and the other side of said primary winding to said second terminal, (g) means connecting one side of said secondary winding to the control electrode of said second gated unidirectional conducting means and the other side of said secondary winding to said first terminal, (h) said primary and secondary windings inductively related to provide voltages at the respective sides of said windings connected to said control electrodes for gating the corresponding gated unidirectional conducting means, (i) a control winding on said transformer,
(j) a controlled rectifier device, including a control electrode, connected in series with said control winding, and
(k) means connected to the control electrode of said controlled rectifier device for applying gating signal thereto for changing the impedance of said device.

References Cited

UNITED STATES PATENTS

| | | | |
|---|---|---|---|
| 3,146,392 | 8/1964 | Sylvan | 323—22 |
| 3,210,571 | 10/1965 | Hutson | 307—88.5 |
| 3,249,807 | 5/1966 | Nuckolls | 307—88.5 X |

MILTON O. HIRSHFIELD, *Primary Examiner.*

J. D. TRAMMELL, *Assistant Examiner.*